INVENTORS.
MORTON BEROZA
MALCOLM C. BOWMAN
BY R. Hoffman
ATTORNEY

INVENTORS.
MORTON BEROZA
MALCOLM C. BOWMAN
BY R. Hoffman
ATTORNEY

United States Patent Office 3,506,824
Patented Apr. 14, 1970

3,506,824
APPARATUS FOR COMBINING A GAS CHROMATOGRAPH WITH A SPECTROPHOTOFLUOROMETER AND OTHER DEVICES BY MEANS OF A FLOWING LIQUID INTERFACE
Morton Beroza, 821 Malta Lane, Silver Spring, Md. 20901, and Malcolmn C. Bowman, 114 Fulwood Blvd., Tifton, Ga. 31794
Filed Apr. 22, 1968, Ser. No. 723,051
Int. Cl. G01n 21/26
U.S. Cl. 250—43.5   16 Claims

ABSTRACT OF THE DISCLOSURE

An apparatus which combines a gas chromatograph with an analytical instrument such as a spectrophotofluorometer in such a manner that the substances which are separated in the gas chromatograph are absorbed in a flowing stream of solvent and monitored in a flow cell of the spectrophotofluorometer or in some other appropriate analytical instrument depending on the property of the solute being determined.

---

A non-exclusive, irrevocable, royalty-free license in the invention herein described, throughout the world for all purposes of the United States Government, with power to grant sub-licenses for such purposes, is hereby granted to the Government of the United States of America.

This invention relates to a new apparatus that monitors the fluorescence or other property of compounds emerging in the effluent from a gas chromatograph.

Although gas chromatography has been joined with a variety of instruments, combinations previous to the present apparatus have maintained the gas chromatographic effluent in a vapor state by heating the exiting lines and the detector cell, or the compounds were degraded to volatile products, or substances in the effluent were volatile.

One object of the present invention is to combine a gas chromatograph with an analytical instrument, such as the spectrophotofluorometer (SPF), to monitor fluorescent or other properties of substances in a gas chromatographic effluent. Another object is to obtain data in a form that is normally recorded in the literature. Still another object is to improve speed and sensitivity of analyses. A further object is to circumvent the need to trap out minute amounts of substances for analysis. A still further object is to provide more certain identification of substances in a gas chromatographic effluent than can be ascertained by retention time alone. An additional object is to eliminate interference so that cleanup of the sample is minimal. Another additional object is to provide combinations having increased analytical capabilities in the analysis of compounds that do not boil at low temperatures. Still another additional object is to provide a device in which compounds do not have to be degraded to low-boiling substances prior to analysis. A further additional object is to provide a unique device to couple the gas chromatograph and an instrument by means of a flowing solvent stream. One more object is to provide a device for collecting a gas chromatographic effluent with a solvent stream that may be monitored with an analytical device.

The invention will be illustrated with the combination of a gas chromatograph and a spectrophotofluorometer.

In the complete apparatus, fluorescent substances are separated in the gas chromatograph and, upon emergence, are absorbed by a flowing stream of ethanol as the carrier gas escapes; the ethanol solution then passes through a flow cell that is monitored by a recording spectrophotofluorometer. A strip chart recorder presents an elution pattern which relates fluorescence of the eluted substances, to retention line.

Figure 1:
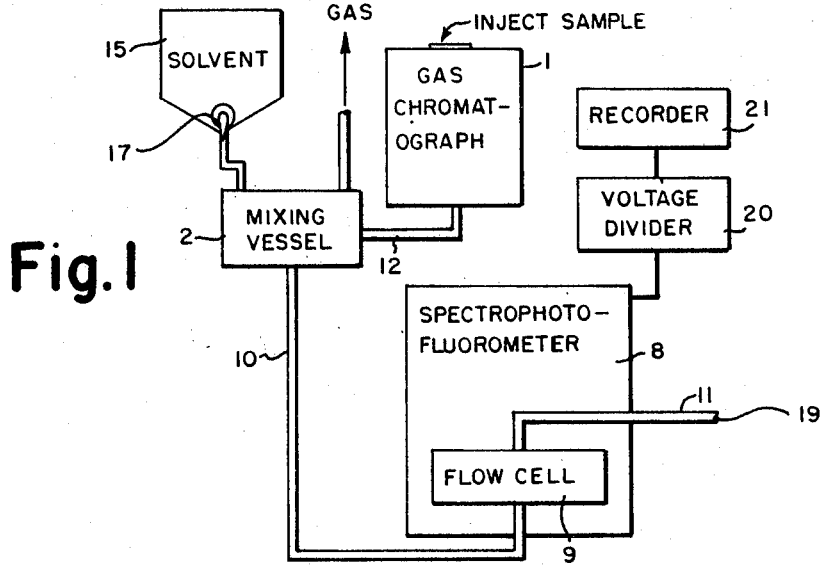
FIGURE 1 is a schematic representaion of a typical competely assembled apparatus.
Figure 2:
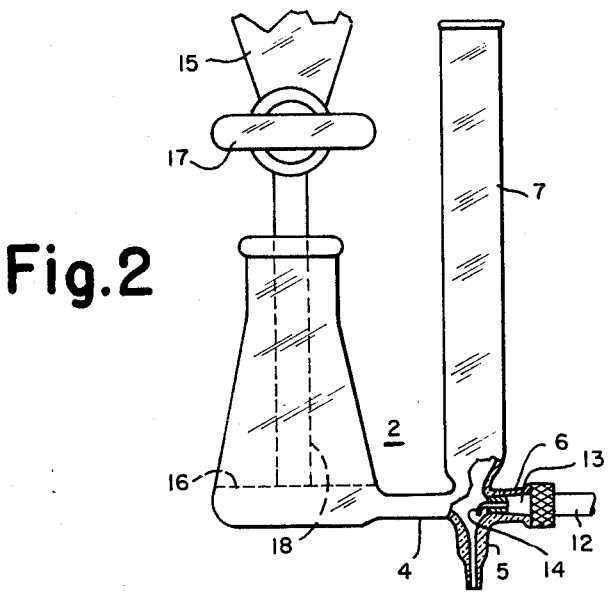
FIGURE 2 is a partial cross-section of the mixing vessel and the gas chromatographic exit port.
Figure 3A:
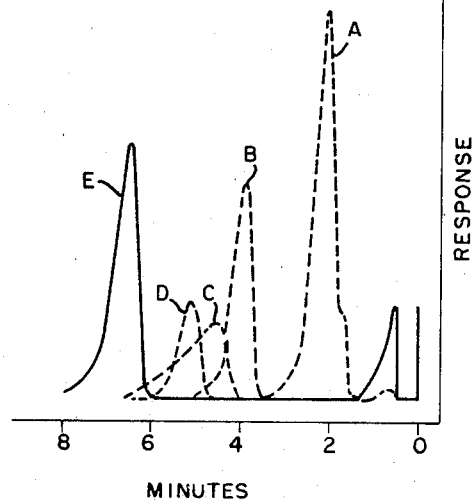
FIGURE 3 is a chart showing a typical elution pattern obtained for several types of compounds.
Figure 3B:
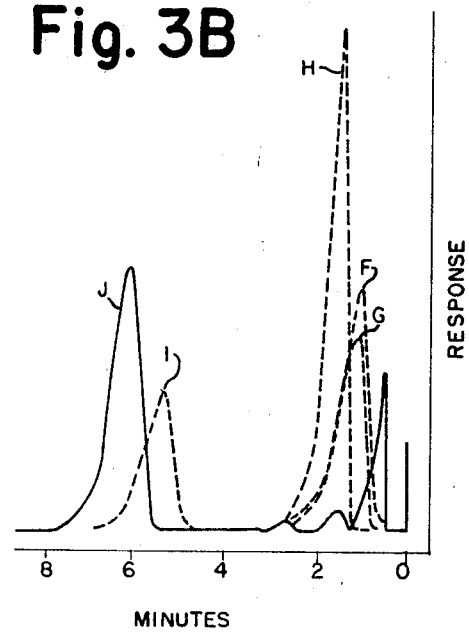
Figure 3C:
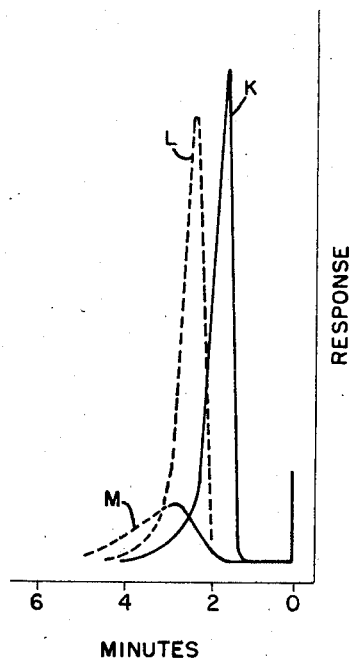

More particularly, as show in FIGURES 1 and 2, the apparatus comprises a gas chromatograph 1; a borosilicate glass mixing vessel 2 fabricated from a 25 ml. Erlenmeyer or similar flask, a 15 mm. length of 1.5 mm. I.D. capillary tubing 4, a male Luer fitting 5, a female Luer fitting 6, and a 10 cm. length of 11 mm. O.D. tubing 7; a spectrophotofluorometer 8 equipped with a flow-through cell 9, and Teflon tubing 10 connecting the mixing vessel 2 to a flow cell 9, and Teflon tubing 11 exiting from the flow cell 9. The gas chromatograph 1 is operated in the usual manner although its detector is not used; instead, a 1/8 inch O.D. stainless steel line 12 conducts the carrier gas from the gas chromatographic column exit to the mixing vessel 2 shown in FIGURE 2. The line 12 terminates in a male Luer fitting 13 which is drilled to accommodate a short length of 1/16 O.D. stainless steel needlestock tubing 14 bent as shown in FIGURE 2 and silver soldered into the line. Female Luer 6 attaches male Luer 13 (exit port of the gas chromotograph) and holds the mixing vessel 2 in place. The height of the 1-liter separatory funnel 15 is adjusted to maintain a 5 mm. height of liquid 16 when the separatory funnel 15 is stoppered and its stopcock 17 is opened. When the liquid level drops below the stem 18, which is cut perpendicular to the axis of separatory funnel 15, air rushes into separatory funnel 15 and liquid emerges and seals stem 18 from further incursion of air. In this manner the level of liquid 16 is maintained in the Erlenmeyer flask. Luer fitting 5 is connected to the bottom of the flow cell by means of a hypodermic needle and 1.5 mm. I.D. Teflon tubing 10. Flow rate of solvent is regulated by maintaining the end of the liquid system 19 (liquid outlet) a fixed distance below the liquid level 16 in the Erlenmeyer flask of the mixing vessel 2. Thus, the flow rate of 95% ethanol used in this development was 3 ml. per minute when the outlet 19 was set 27 cm. below the liquid level 16. (Other flow rates were also used if advantageous.) As the substances emerge in the effluent of the gas chromatograph 1, they are absorbed in a small volume of the flowing solvent in the mixing vessel 2 while the carrier gas escapes through tube 7. The substances in solution flow down Teflon tubing 10 into flow cell 9 of spectrophotofluorometer 8 where they register their presence by means of a voltage divider 20 and a strip chart recorder 21. The exiting liquid may be discarded, collected with a fraction collector, or otherwise, for additional examination on analytical instruments or for retrieval of the substances. Typical recording of elution patterns are shown in FIGURES 3A, 3B and 3C.

We employed an Aminco-Bowman spectrophotofluorometer equipped with a xenon lamp, 1P21 detector tube, and a quartz flow cell having a 3 mm. I.D., and 5 mm. O.D. The slit arrangement was 5–5–5 mm. and no slits were used in the flow cell. The photomultiplier microphotometer was connected via a center-tapped potentiometer (voltage divider) to a 1 mv. Bristol recorder having a chart speed of 0.5 inch per minute and a disc integrator attachment. The potentiometer was adjusted to give the same reading on the recorder as appeared on the meter of the microphotometer. The dark current was zeroed with the shutter closed and the shutter was locked open during operation of the apparatus. The zero knob of the microphotometer adjusted the height of the base line, and the meter multiplier served as range selector or attenuator. Range settings of 1.0, 0.3, 0.03, and 0.01 were used. The 0.003 and 0.001 settings were too sensitive.

The following operations are typical in using the apparatus: The gas chromatograph and spectrophotofluorometer are started in the conventional manner as is well known in the art. The separatory funnel is filled about ⅘ full with ethanol or other solvent, stoppered and positioned with the tip of its stem 5 mm. above the bottom of the Erlenmeyer flask. The stopcock of the separatory funnel is opened and any air bubbles in the line are removed. The flow rate of solvent is adjusted to 3 ml. per minute by raising or lowering the liquid outlet. The desired excitation and emission wavelengths are set; the dark current zero and the height of the base line are adjusted and the appropriated sensitivity is set with the meter multiplier.

Response may be based on peak height or peak area. Peak height, expressed as relative intensity (RI), was obtained by multiplying recorder response (meter) by meter multiplier setting (MM), i.e. $RI = \text{meter} \times MM$. Peak area was obtained by multiplying disc integrator units under the curve by meter multiplier setting; one traversal of the integrator pen was assigned a value of 100 units.

The examples which follow are intended to illustrate the operation of the above described apparatus. The data obtained in these examples, specifically wavelength settings of the spectrophotofluorometer, gas chromatographic oven temperatures, responses for amounts injected, estimated lowest detectable quantities, and retention times in the chromatography are given in Table 1. A glass column, 4 mm. I.D., containing 5% w./w. QF-1 on 80–100 mesh Gas Chrom Q was used in the gas chromatograph. Alcohol flow rate was 3 ml. per minute. FIGURES 3A, 3B and 3C illustrate typical chromatograms obtained with 7 methylenedioxyphenyl compounds and 5 polynuclear hydrocarbons (air pollutants). Less than 1 nanogram (ng.) of some compounds was detectable based on a noise level of 0.01 relative intensity. As is well known in the art fluorescent properties of compounds differ greatly and vary with the wavelengths monitored. Sensitivity parallels fluorescence intensity at chosen wavelengths.

As may be noted in FIGURES 3A, 3B and 3C peak shapes are good and excessive peak spread did not occur in passage of substances from the gas chromatograph to the spectrophotofluorometer via the flowing liquid interface. Although a small peak of unknown origin appeared at 0.35 minute retention time, it did not interefer with analyses.

Detailed data relating to the chromatograms of FIGURES 3A, 3B and 3C given in Table 2. Chromatograms A–E, FIGURE 3A, are polynuclear hydrocarbons and F–M, FIGURES 3B and 3C, are methylenedioxyphenyl compounds. The chemicals subjected to analysis were obtained from commercial sources. Their identities are appararent from their names except for the four compounds with common or trade names; these have the following chemical identities: piperonyl butoxide is alpha-[2-(2-butoxyethoxy)ethoxy-4,5-(methylenedioxy) - 2 - propyltoluene]; Bucarpolate is 2-(2-butoxyethoxy)ethyl piperonylate; Sesamex is 2-(2-ethoxyethoxy)ethyl 3,4-(methylenedioxy)phenyl acetal of acetaldehyde; sulfoxide is 1,2-(methylenedioxy)-4-[2-(octylsulfinyl)propyl]benzene.

In a manner similar to the above, carbaryl (1-napthyl methylcarbamate) and 1-naphthol were successfully analyzed in milk and corn extracts. Recovery of carbaryl and 1-naphthol added to milk at the level of 0.5 p.p.m. was 95–100% and 75–78%, respectively. In the chromatography of carbaryl it hydrolyzes to 1-naphthol, which is the substance measured. Excitation wavelength was 306 m$\mu$ and emission wavelength 362 m$\mu$. With the oven set at 105° C. the smallest amount of 1-naphthol detectable was 2 ng. No interfering peaks appeared in the chromatograms of unfortified milk extracts. Analyses were rapid since cleanup was minimal. Cleanup was minimal because the apparatus does not sense the nonfluorescing extraneous material, but does sense the fluorescing 1-naphthol at the point of maximum emission.

Figure 4:
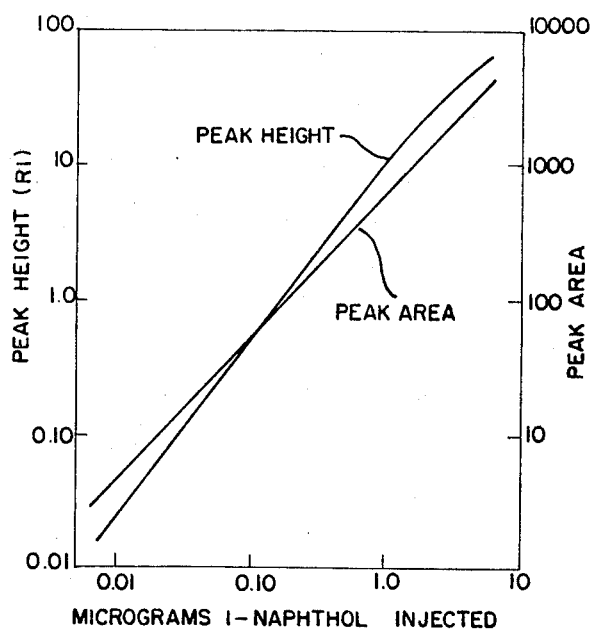
FIGURE 4 is a plot of standard curves of 1-naphthol vs. response by peak height and peak area.

FIGURE 4 shows that the response of 1-naphthol by peak area is practically linear with amount added over 3 decades of concentration; response by peak height is linear for only two decades of concentration. Sensitivity is in the nanogram range.

Proper operation of the apparatus requires minimum spread of peaks and attainment of maximum sensitivity. Spread of peaks was minimized by mixing the emerging carrier gas and its solute with a minimum volume of ethanol in the mixing vessel (FIGURE 2) and using small bore Teflon tubing to transfer the ethanol from the mixing vessel to the flow cell. Although dead volume was held to a minimum, about 20 seconds or about a 1 ml. volume at 3 ml. per minute, was required for this transfer, and the appearance of the chromatogram was delayed 20 seconds. This delay could be reduced with a flow rate faster than 3 ml./min. but sensitivity would be sacrificed. Another means of reducing the delay and improving resolution is to shorten the distance between the mixing cell and the flow cell.

The flow rate was regulated by the gravity drop of the alcohol (height difference between liquid inlet and outlet), an arrangement that proved to be both trouble-free and flexible. The volume of ethanol in the separatory funnel was maintained between 400 and 850 ml. for best operation. An Erlenmeyer flask was used in the mixing vessel to hold changes in the liquid level to a minimum; when the level dropped sufficiently, air rushed into the separatory funnel and released liquid into the flask. Since the liquid level was located where the diameter of the Erlenmeyer flask was largest, the liquid level changed very little during the entire operation.

The exit port of the gas chromatograph was kept at 200° C. to avoid solute retention. Cooling of the port or transfer of heat to the flowing alcohol was not excessive, because the exit port was made of a poor thermal conductor (stainless steel) and very little of its surface was exposed to the liquid. In addition the carrier gas was forced through a narrow tube (1/16 inch O.D. stainless steel) on exiting from the gas chromatograph so that when the tube did cool some, the increased gas flow did not allow the exit tube to retard passage of the solute appreciably. The narrow tube also broke the outlet gas stream into small bubbles, which increased the efficiency of solute pickup by the flowing alcohol. These design features overcame the incompatibility of the hot (200° C.) exit port of the gas chromatograph and the flowing alcohol interface at room temperature.

It is apparent to those skilled in the art that the present apparatus may be used to combine the gas chromatograph with one or more analytical instruments, e.g. ultraviolet and other spectrophotometers, colorimeters, coulometers. The flowing liquid may also be one that will enter into a reaction with the exiting solute. For example, the sodium salt of certain compounds fluoresce stronger than the compound itself; through the use of an alkaline solution, the compound could form a salt to produce the stronger fluorescence.

When spectrophotofluorometry is used to detect an unknown substance, the maximum excitation and emission wavelengths are not known. The need to use different wavelengths for each compound has both advantages and drawbacks. Thus, certain wavelengths may give rise to maximum sensitivity for one compound of a mixture and suppress response to the remaining ingredients which might ordinarily interfere. Also, by appropriate selection of wavelengths the response of several compounds in a mixture may each be enhanced enough to allow their individual analyses. It is presumed, however, that mixtures in a gas chromatographic effluent will not be overly complex owing to the high resolving power of the gas chromatograph. The simplest way to retermine the desired wavelengths with the present set-up is to collect the liquid effluent from the flow cell (e.g. with a fraction collector) and select these wavelengths from the complete excitation and emission spectra of the liquid effluent. The collected fractions may be used to assess the purity of a substance of a peak since the spectra of the front and rear sections may be checked for identity. With a completely unknown gas chromatographic effluent the checking of several sets of wavelengths will help prevent overlooking anything important.

A useful feature of the apparatus is that the spectra normally available, i.e. in a solvent, may be used to set up analyses. The spectra of a wide variety of compounds are available in most laboratories or libraries. Spectra of vapors are usually not available and these may differ with temperature.

The efficiency of collecting substances with the flowing liquid was checked with 1-naphthol. Recoveries at a flow rate of 0.5, 1, 2, 3, 4 and 5 ml. of 95% ethanol per minute were 99, 96, 80, 79, 76 and 74%, respectively, when 5 $\mu$g. amounts of 1-naphthol were injected.

The spectrum or other property or properties of the collected liquid or the solute therein may be used to establish the identity of an eluted substance with greater certainty.

The apparatus and examples described are meant to be illustrative and not limiting. It is understood that variations of the device may be made, dimensions may be changed, chromatographic conditions and packings may be different without departure from the basic idea presented.

terial having a low thermal conductivity and the orifice of said exit port being restricted to a small bore;

(b) a mixing vessel in which a constant level of liquid is maintained, said vessel provided with a liquid conducting passageway, said liquid conducting passageway being in register with the aforesaid vapor conducting passageway and provided with gas chromatographic carrier gas escape means;

(c) a reservoir provided with means for maintaining a constant level of liquid in the aforesaid mixing vessel;

(d) an analytical instrument equipped with means for monitoring the properties of substances in the gas chromatographic effluent; and (e) means for recording an elution pattern, said means relating retention time to other analytical properties of the eluted substance.

2. The apparatus of claim 1 in which the analytical instrument is a spectrophotofluorometer.

3. The apparatus of claim 1 in which the vapor conducting passageway is made of stainless steel.

4. The apparatus of claim 1 in which the solute in the gas chromatographic effluent is transported to the analytical instrument by means of a minimum volume flowing liquid interface.

5. The apparatus of claim 1 in which means are provided to collect fractions exiting from the analytical instrument.

6. The apparatus of claim 1 in which a series of analytical instruments to monitor a variety of solute properties are provided.

7. The apparatus of claim 1 in which the component parts are adjustable to regulate the rate of liquid flow.

TABLE 1.—DATA ON 8 METHYLENEDIOXPHENYL COMPOUNDS AND 5 POLYNUCLEAR HYDROCARBONS GAS CHROMATOGRAPHED ON A QF-1 COLUMN WITH SPECTROPHOTOFLUOROMETRIC DETECTION

| Compound | Wavelength settings, m$\mu$ | | Quantity injected [1] ($\mu$g) | Oven temp. of gas chromatograph (° C.) | Response | | | Smallest detactable quantity [2] (ng.) | Retention time (min.) |
| --- | --- | --- | --- | --- | --- | --- | --- | --- | --- |
| | $\lambda$Ex | $\lambda$Em | | | Meter | MM | RI | | |
| Safrole | 288 | 334 | 0.5 | 130 | 59 | 0.1 | 5.9 | 0.2 | 1.40 |
| Dihydrosafrole | 290 | 332 | 0.5 | 130 | 60 | 0.1 | 6.0 | 0.2 | 1.45 |
| Isosafrole | 312 | 348 | 0.5 | 130 | 54 | 0.3 | 16.2 | 0.6 | 2.15 |
| Sesamex | 297 | 345 | 5.0 | 130 | 16 | 0.1 | 1.6 | 60 | [3] 2.50 |
| Sulfoxide | 292 | 333 | 0.5 | 130 | 21 | 0.03 | 0.63 | 16 | [3] 2.70 |
| | | | | 180 | 28 | 0.1 | 2.8 | 4 | [3] 1.05 |
| Piperonyl alcohol | 285 | 333 | 0.5 | 130 | 63 | 0.03 | 1.9 | 5 | 3.15 |
| | | | | 180 | 24 | 0.1 | 2.4 | 4 | 1.10 |
| Piperonyl butoxide | 295 | 333 | 0.5 | 180 | 18 | 0.03 | 0.54 | 19 | 5.50 |
| Bucarpolate | 300 | 350 | 0.5 | 180 | 31 | 0.03 | 0.93 | 11 | 6.30 |
| Fluorene | 292 | 320 | 0.2 | 150 | 46 | 0.1 | 4.6 | 0.9 | 2.05 |
| Anthracene | 293 | 353 | 0.5 | 160 | 10 | 0.1 | 1.0 | 10 | 4.65 |
| p-Terphenyl | 294 | 341 | 0.05 | 180 | 26 | 0.1 | 2.6 | 0.4 | 3.90 |
| Chrysene | 322 | 372 | 0.5 | 200 | 12 | 0.1 | 1.2 | 9 | 5.15 |
| Benzo[$\alpha$]pyrene | 383 | 408 | 0.1 | 220 | 31 | 0.1 | 3.1 | 0.7 | 6.35 |

[1] Injected in 5 $\mu$l 95% ethanol, chloroform, or ethyl acetate.
[2] Estimated on the basis of a noise level of 0.01 RI.
[3] The short retention time indicates peak is due to a decomposition product.

TABLE 2.— IDENTIFICATION OF CHROMATOGRAMS AND DATA RELATING TO FIGURE 3

| Identification letter | Compound | Amount injected, $\mu$g. | Meter multiplier setting | Oven temp., ° C. |
| --- | --- | --- | --- | --- |
| A | Fluorene | 0.2 | 0.1 | 150 |
| B | p-Terphenyl | 0.05 | 0.1 | 180 |
| C | Anthracene | 0.5 | 0.1 | 160 |
| D | Chrysene | 0.5 | 0.1 | 200 |
| E | Benzo[$\alpha$]pyrene | 0.1 | 0.1 | 220 |
| F | Sulfoxide | 0.5 | 0.1 | 180 |
| G | Piperonyl alcohol | 0.5 | 0.1 | 180 |
| H | Dihydrosafrole | 0.5 | 0.1 | 130 |
| I | Piperonyl butoxide | 0.5 | 0.03 | 180 |
| J | Bucarpolate | 0.5 | 0.03 | 180 |
| K | Safrole | 0.5 | 0.1 | 130 |
| L | Isosafrole | 0.5 | 0.1 | 130 |
| M | Sulfoxide | 0.5 | 0.1 | 130 |

We claim:

1. An apparatus for measuring and recording fluorescence and other properties of substances in gas chromatographic effluents comprising:

(a) a gas chromatograph with an exit port having the capacity to be maintained at elevated temperatures, said exit port having minimum contact with the flowing liquid interface and being constructed of material having a low thermal conductivity and the 8. A method of monitoring fluorescence and other analytical properties of substances in effluents flowing from a gas chromatographic exit port, said exit port having the capacity to be maintained at elevated temperatures, said method comprising absorbing the solute of said effluents in a flowing stream of solvent, transporting said solute to an analytical instrument, said instrument being provided with means for monitoring one or more analytical properties of the solute.

9. The method of claim 8 in which the analytical property monitored is fluorescence.

10. The method of claim 8 in which the solvent is ethanol.

11. The method of claim 8 in which the solute is transported to the analytical instrument by a minimum volume flowing liquid interface.

12. The method of claim 8 in which more than one property of the solute is monitored.

13. The method of claim 8 in which the monitored fractions are collected.

14. A method of analyzing vaporizable unknown material comprising separating the material by gas chromatography so that the effluent containing the separated components flows from the gas chromatographic exit port, said exit port having the capacity to be maintained at elevated temperatures, then absorbing the solute of said effluent in a minimum volume flowing liquid interface, and transporting said solute by means of said flowing liquid to an analytical instrument provided with means for determining one or more properties of said solute.

15. The method of claim 14 in which the orifice of the gas chromatographic exit port is restricted to a small bore.

16. The method of claim 14 in which the exit port is maintained at 200° C.

References Cited

UNITED STATES PATENTS

| | | | |
|---|---|---|---|
| 3,134,898 | 5/1964 | Burnell et al. | 250—43.5 |
| 3,352,221 | 11/1967 | Barron et al. | 250—71 X |
| 3,400,264 | 9/1968 | Bull | 73—23 X |

RALPH G. NILSON, Primary Examiner

D. L. WILLIS, Assistant Examiner

U.S. Cl. X.R.

73—23; 250—71